United States Patent [19]

Sasaki et al.

[11] Patent Number: 4,804,259
[45] Date of Patent: Feb. 14, 1989

[54] LIGHT TRANSMITTING FIBER

[75] Inventors: Isao Sasaki, Hiroshima; Kozi Nishida, Otake; Masaru Morimoto, Otake; Hisao Anzai, Otake; Hideaki Makino, Otake, all of Japan

[73] Assignee: Mitsubishi Rayon Company Ltd., Tokyo, Japan

[21] Appl. No.: 854,615

[22] Filed: Apr. 22, 1986

[30] Foreign Application Priority Data

Apr. 25, 1985 [JP] Japan ..................... 60-87428

[51] Int. Cl.$^4$ ............. D02G 3/00; B29D 11/00
[52] U.S. Cl. ..................... 350/96.34; 350/96.30; 428/373; 428/375; 428/392; 428/394; 428/395
[58] Field of Search ............ 428/373, 375, 392, 394, 428/421; 350/96.30, 96.34; 526/245

[56] References Cited

U.S. PATENT DOCUMENTS

| | | | |
|---|---|---|---|
| 4,246,374 | 1/1981 | Kopchik | 525/379 |
| 4,255,322 | 3/1981 | Kopchik | 524/322 |
| 4,544,235 | 10/1985 | Nishida et al. | 350/96.3 X |
| 4,593,974 | 6/1986 | Kamamoto et al. | 428/373 X |

FOREIGN PATENT DOCUMENTS 0155567 9/1985 European Pat. Off. .
60-235817 11/1985 Japan ..................... 526/245

Primary Examiner—Lorraine T. Kendell
Attorney, Agent, or Firm—Oblon, Fisher, Spivak, McClelland & Maier

[57] ABSTRACT

Disclosed is an improved light transmitting fiber comprising a transparent inorganic substance or organic polymeric material as a core component and a methacrylate polymer as a cladding component. The methacrylate polymer is a methacrylimide-containing fluoroalkyl methacrylate polymer comprising (A) 2 to 98 weight % of methacrylimide units of formula (I):

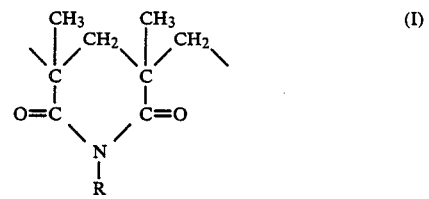

wherein R represents a hydrogen atom or a hydrocarbon group having 1 to 20 carbon atoms, (B) 98 to 2 weight % of structural units derived from a fluoroalkyl methacrylate monomer, and (C) 0 to 50 weight % of structural units derived from a monomer copolymerizable with the monomer (B).

6 Claims, 2 Drawing Sheets

LIGHT TRANSMITTING FIBER

BACKGROUND OF THE INVENTION (1) Field of the Invention

The present invention relates to a light transmitting fiber comprising a novel cladding material.

(2) Description of the Related Art

Generally, in a step index type light transmitting fiber, the periphery of a core having a high refractive index is covered with a cladding having a low refractive index so that the entire internal total reflection is utilized, and the larger the difference of the refractive index between the core and cladding, the better the light transmitting property.

Multi-component glass, quartz glass or the like have been mainly used as the base of the core, and light transmitting fibers formed by covering this core with a cladding material composed of a glass or synthetic resin having a refractive index different from that of the core have been developed. However, since glass has a poor flexibility and the fibers are easily broken, a light transmitting fiber comprising a core of a synthetic fiber has been proposed. For example, a light transmitting fiber comprising a core composed of polystyrene and a cladding composed of an acrylic resin such as polymethyl methacrylate, and a light transmitting fiber comprising a core composed of polymethyl methacrylate and a cladding composed of a fluorine-containing polymer are now commercially available.

Of these commercially available light transmitting fibers, a light transmitting fiber comprising a core composed of polymethyl methacrylate has an excellent light-transmitting property and has a superior flexibility and heat resistance to a light transmitting fiber comprising a core composed of polystyrene. Therefore, this light transmitting fiber is used for short-distance light communication.

However, the refractive index of polymethyl methacrylate is 1.49, at the lowest level among generalpurpose resins, and therefore, if polymethyl methacrylate is used as the core, the number of polymers that can be used as the cladding is limited.

For example, Japanese Examined Patent Publications No. 43-8978, No. 54,24302, No. 56-49326, No. 56-8321, and No. 56-8322 disclose light transmitting fibers comprising a core of a polyalkyl methacrylate clad with a polyfluoroalkyl methacrylate. Japanese Examined Patent Publication No. 53-42260 discloses a light transmitting fiber comprising a vinylidene fluoride/tetrafluoroethylene copolymer as the cladding. The light-transmitting property of the light transmitting fiber is significantly influenced by the light absorbing and scattering properties of the core and cladding and the light reflectance in the boundary interface between the core and cladding.

A fluoroalkyl methacrylate polymer proposed as the cladding material exhibits a very small absorption and scattering and the light transmission loss caused by these two factors can be reduced, but this polymer has a poor heat resistance. If the heat resistance of the cladding is poor, although the core has a substantially sufficient heat resistance, the optical fiber as a whole has a poor heat resistance. Accordingly, the fluoroalkyl methacrylate polymer heretofore proposed as the cladding material has an insufficient heat resistance. Of the fluoroalkyl methacrylate polymers, a polymer of 2,2,2-trifluoroethyl methacrylate has a higher heat resistance, but the glass transition temperature of this polymer is 83° C. and that of a polymer of 2,2,2,2′,2′,2′-hexafluoroisopropyl methacrylate is 95° C. On the other hand, the glass transition temperature of polymethyl methacrylate is 100° C., and a cladding material having a glass transition temperature higher than that of polymethyl methacrylate has not been developed.

The density of double bond electrons having a radical polymerizability in the fluoroalkyl methacrylate polymer is lower than in the corresponding alkyl methacrylate polymer, and the molecular structure readily undergoes radical depolymerization. Accordingly, the characteristics given to the fluoroalkyl methacrylate polymer at the time of production thereof are degraded, as the processing involves repeated shaping under heating. Also, the polymerization degree is reduced and the characteristics are drastically degraded by the plasticizing effect of the monomer formed by depolymerization.

These fluorine-containing polymers have an optical characteristic such as a low refractive index, as pointed out hereinbefore. Furthermore, the molecular structure of these polymers gives surface characteristics such as water-repellant and oil-repellant properties, as prominently observed in polytetrafluoroethylene. Fluorine-containing polymers now widely used as industrial material are characterized by such surface properties whereby they cannot be wetted by either water or oil. A fluoroalkyl methacrylate polymer has water-repellant and oil-repellant properties as well as these fluorinecontaining polymers but this polymer has extremely poor adhesion to the core, which is a very important property in the light transmitting fiber. Namely, the adhesion to not only polymethyl methacrylate as the core but also an acryl-modified resin having excellent heat resistance or an optical glass of the quartz or multi-component type is poor. In addition, the cladding of this polymer is easily separated from the core when the optical fiber is bent or drawn. Therefore, the fluoroalkyl methacrylate polymer has good optical characteristics but poor mechanical characteristics and heat resistance, so that the polymer cannot be put into practical use.

A vinylidene fluoride/tetrafluoroethylene copolymer such as a copolymer disclosed in Japanese Examined Patent Publication No. 53-42260 has excellent resistance against thermal decomposition and also excellent adhesion to polymethyl methacrylate as the core. However, this polymer is crystalline and opaque, and accordingly, the transmission loss by scattering is very large. Therefore, if the polymer is held in an atmosphere maintained at 80° to 90° C., crystallization is advanced and the light transmission loss is greatly increased by scattering caused by the growth of the crystal.

SUMMARY OF THE INVENTION

It is a primary object of the present invention to provide a light transmitting fiber comprising a cladding which has an enhanced heat resistance, resistance against thermal decomposition, and adhesion to the core, while maintaining the excellent properties of the fluorine-containing polymer conventionally used as the cladding material, especially a fluoroalkyl methacrylate polymer, which is a transparent polymer having a low refractive index and a much reduced absorption and scattering.

In accordance with the present invention, there is provided a light transmitting fiber comprising as a cladding component a methacrylimide-containing fluoroalkyl methacrylate polymer comprising (A) 2 to 98% by weight of methacrylimide units represented by the following general formula (I):

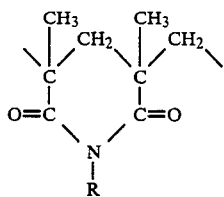

wherein R represents a hydrogen atom or an aliphatic, aromatic or alicyclic hydrocarbon groups having 1 to 20 carbon atoms, (B) 98 to 2% by weight of structural units derived from a fluoroalkyl methacrylate monomer and (C) 0 to 50% by weight of structural units derived from a monomer copolymerizable with the fluoroalkyl methacrylate monomer (B).

DESCRIPTION OF THE PREFERRED EMBODIMENTS

Figure 1:
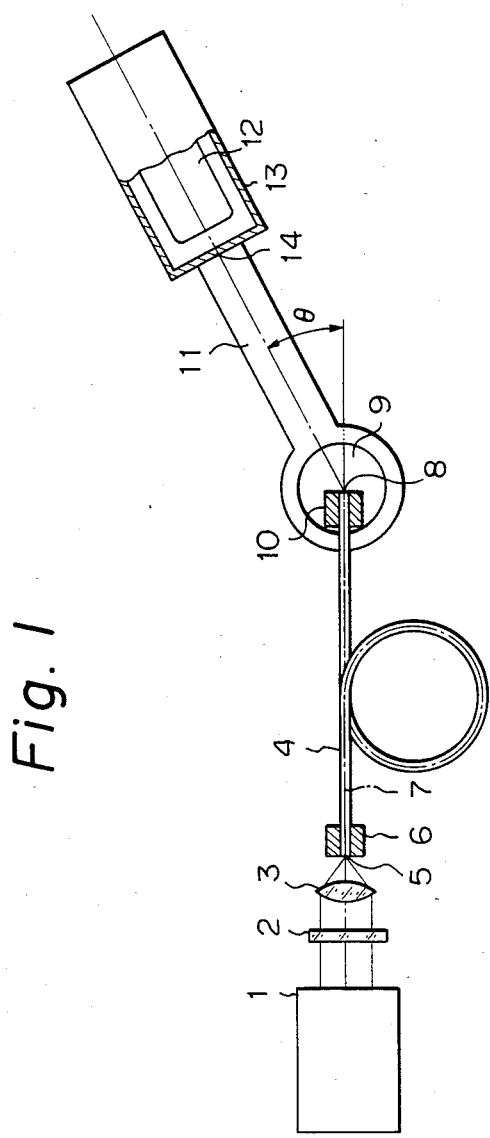
FIG. 1 is a diagram illustrating the structure of the apparatus used in the examples to measure the aperture number of the light transmitting fiber of the present invention; and, FIG. 2 is a curve used for determined the 2 $\theta_w$ value when measuring the aperture number in the apparatus shown in FIG. 1.

The light transmitting fiber has a core-cladding structure as described hereinbefore. As the core, transparent organic polymers such as a polymer having recurring units of methyl methacrylate, a methacrylimide-containing acryl modified polymer, polystyrene and a polycarbonate, and transparent inorganic substances such as quartz and multi-component optical glass can be used, although the core materials that can be used in the present invention are not limited to the materials mentioned above. The light transmitting fiber of the present invention can take the form of not only a core-cladding fiber (optical fiber line) but also a structure obtained by forming an appropriate number of protecting and covering layers around the periphery of the fiber (optical fiber core line, optical fiber cord or optical fiber cable) or a structure comprising a reinforcer such as an interior tension member.

In the methacrylimide structural units (A) of the cladding material of the present invention, R in the general formula (I) represents a hydrogen atom or a saturated or unsaturated (unsaturated bond-containing) aliphatic, aromatic or alicyclic hydrocarbon group (which may have a substituent selected from a halogen atom and an organic group except such a hydrocarbon group) having 1 to 20 carbon atoms. As typical instances, there can be mentioned a hydrogen atom, a methyl group, and ethyl group, an n-propyl group, an isopropyl group, an n-butyl group, and isobutyl group, a tertbutyl group, a phenyl group, a substituted phenyl group, a cyclohexyl group and a bornyl group. From the viewpoint of the heat resistance and molding processability, a hydrogen atom, a methyl group and a cyclohexyl group are especially preferred.

The methacrylimide-containing fluoroalkyl methacrylate polymer used in the present invention may contain either only one kind of the structural units (A) or at least two different kinds of the structural units (A).

As the structural units (B) that can be formed from the fluoroalkyl methacrylate monomer, there can be mentioned structural units represented by the following general formulae (II) and (III):

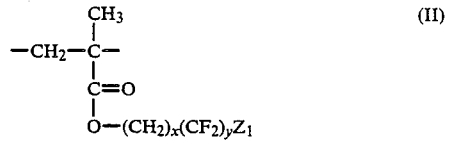

wherein x is 1 or 2, y is 0 or an integer of from 1 to 10, and $z_1$ represents a hydrogen atom or a fluorine atom,

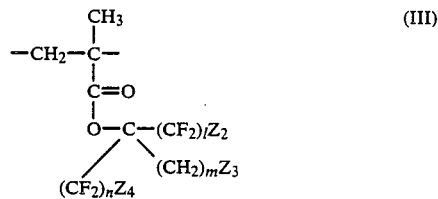

and
wherein l, m and n are 0 or integers of from 1 to 0, and $Z_2$, $Z_3$ and $Z_4$ represents a hydrogen atom or a fluorine atom, with the proviso that the case where all of the l, m and n are 0 and the case where all of $Z_2$, $Z_3$ and $Z_4$ represent a hydrogen atom are excluded.

The methacrylimide-containing fluoroalkyl methacrylate polymer used in the present invention may contain either only one kind of the structural units (B) or at least two different kinds of the structural units (B).

As typical instances of the fluoroalkyl methacrylate monomer capable of forming the above-mentioned structural units (B), there can be mentioned 2,2,2-trifluoroethyl methacrylate, 2,2,3,3-tetrafluoropropyl methacrylate 2,2,3,3,3-pentafluoropropyl methacrylate, 2,2,3,3,4,4-hexafluorobutyl methacrylate, 2,2,3,3,4,4,4-heptafluorobutyl methacrylate, 2,2,3,3,4,4,5,5,6,6,7,7,8,8,9,9,9-heptadecafluorononane methacrylate, 2,2,2,2',2',2'-hexafluoroiospropyl methacrylate and 2,2,2,2',2'-pentafluoroisopropyl methacrylate.

From the viewpoint of the heat resistance alone, it is preferred that the structural units (C) that can be formed from a vinyl monomer copolymerizable with the fluoroalkyl methacrylate monomer (B) be not present. However, since the vinyl monomer exerts a function as a moldability-adjusting agent, the vinyl monomer may be added according to need in view of the properties of the resin.

As the vinyl monomer, there are preferably used acrylic acid, methacrylic acid, and acrylic acid ester, a methacrylic acid ester, styrene, and a substituted styrene.

As the acrylic acid ester, there may be used methyl acrylate, ethyl acrylate, propyl acrylate, n-butyl acrylate, isobutyl acrylate, tert-butyl acrylate, cyclohexyl acrylate, norbornyl acrylate, 2-ethylhexyl acrylate, and benzyl acrylate.

As the methacrylic acid ester, there may be used methyl methacrylate, ethyl methacrylate, propyl methacrylate, n-butyl methacrylate, isobutyl methacrylate, tert-butyl methacrylate, cyclohexyl methacrylate, norbornyl methacrylate, 2-ethylhexyl methacrylate, and benzyl methacrylate.

Among these vinyl monomers, methacrylic acid, methyl methacrylate, and styrene are preferred.

The methacrylimide-containing fluoroalkyl methacrylate polymer used in the present invention may contain either only one kind of the structural units that can be formed from the vinyl monomer, or at least two different kinds of the above-mentioned structural units.

In the methacrylimide-containing fluoroalkyl methacrylate polymer used in the present invention, the structural units (B) act as an indispensible component for manifesting the excellent characteristics of the fluorine-containing polymer. Accordingly, in order to maintain a good balance between these excellent characteristics and the heat resistance and thermal decomposition resistance, it is necessary to appropriately select the amounts incorporated and molecular structures of the methacrylimide structural units (A) and structural units (B).

It is preferred that the inherent viscosity of the methacrylimide-containing fluoroalkyl methacrylate polymer used in the present invention by 0.01 to 3.0 dl/g as determined according to the method described hereinafter. If the inherent viscosity is lower than 0.01 dl/g, the mechanical strength is poor, and if the inherent viscosity exceeds 3.0 dl/g, shaping of the polymer becomes difficult.

For the production of the methacrylimide-containing fluoroalkyl methacrylate polymer used in the present invention, there may be adopted a method in which the monomer capable of forming the methacrylimide structural units (A) is copolymerized with the fluoroalkyl methacrylate monomer capable of forming the structural units (B) and, if necessary, the vinyl monomer capable of forming the structural units (C). Furthermore, there may be adopted a method in which the fluoroalkyl methacrylate monomer capable of forming the structural units (B) is polymerized (homopolymerized or copolymerized), if necessary, with vinyl monomer capable of forming the structural units (C), the obtained fluoroalkyl methacrylate-containing polymer is reacted with at least one member (hereinafter referred to as "imidizing agent") selected from ammonia and primary amines represented by the general formula R—NH$_2$ (in which R is as defined above) in the presence of a solvent in an inert gas at 100° to 350° C. to cause condensation in the side chains of the polymer (hereinafter referred to as "condensation step"), and volatile substances composed mainly of the solvent are separated and removed from the reaction product (hereinafter referred to as "separation step").

In the latter method, it is preferred that the inherent viscosity of the fluoroalkyl methacrylatecontaining polymer be 0.01 to 3.0 dl/g as determined according to the measurement method described hereinafter. Furthermore, it is preferred that the fluoroalkyl methacrylate polymer be composed solely of one or more of fluoroalkyl methacrylate monomers capable of forming the structural units (B).

As the condensation step, it is preferred that the fluoroalkyl methacrylate-containing polymer be dissolved in the solvent and the solution be reacted with the imidizing agent. The solvent used should not inhibit the imidization reaction, that is, the condensation in side chains of the polymer, and in the case of partial imidization, the solvent should not cause any change in the fluoroalkyl methacrylate or methacrylic acid ester segments. Any solvent satisfying these requirements and not inhibiting the attainment of the object of the present invention can be used without limitation. However, preferably a mixed solvent is used, comprising a solvent having a solubility parameter $\delta$ of 14 to 19.5 (cal/cm$^3$)$^{\frac{1}{2}}$ (Polymer Handbook, Second Edition, J. Brandrup and E. H. Immevgut, John Wiley & Sons, New York, 1975) and being substantially incapable of dissolving the fluoroalkyl methacrylate-containing polymer therein at room temperature (hereinafter referred to as "poor solvent") and a solvent having a solubility parameter $\delta$ of 8.5 to 13.9 (cal/cm$^3$)$^{\frac{1}{2}}$ and being capable of dissolving the fluoroalkyl methacrylate-containing polymer therein at room temperature (hereinafter referred to as "good solvent"). As the poor solvent used in the present invention, there can be mentioned methanol, ethylene glycol, and glycerol; methanol is especially preferred. As the good solvent used in the present invention, there can be mentioned alcohols such as ethyl alcohol, isopropyl alcohol, and butyl alcohol, aromatic hydrocarbon compounds such as benzene, toluene, and xylene, ketone-ether compounds such as methyl ethyl ketone, ethylene glycol dimethyl ether, diethylene glycol dimethyl ether, dioxane and tetrahydrofuran, and dimethylformamide, dimethylsulfoxide, and dimethylacetamide. Among these solvents, benzene, toluene, and dioxane are preferred. Since the above-mentioned solvent used in the present invention can easily diffuse the imidizing agent in the fluoroalkyl methacrylate-containing polymer and promptly perform the imidization reaction to exert the effects of controlling and removing heat generated by the reaction, dissolving the imidizing agent and adjusting the viscosity of the dissolved polymer, a transparent methacrylimidecontaining fluoroalkyl methacrylate polymer having a low refractive index and a high heat resistance, which is an intended excellent optical material, can be prepared. From the viewpoint of productivity, it is preferred that the amount of the solvent used in the method of the present invention be small. However, if the amount of the solvent is too small, the above-mentioned effects of the solvent are reduced. Accordingly, it is preferred that the solvent be used in an amount of 10 to 1000 parts by weight per 100 parts by weight of the starting fluoroalkyl methacrylate-containing polymer.

Where a mixed solvent comprising a poor solvent and a good solvent is used in the method of the present invention, the quantitative ratio between the two solvents is not particularly critical.

As specific examples of the imidizing agent represented by the general formula R—NH$_2$, there can be mentioned primary amines such as methylamine, ethylamine, and propylamine, compounds capable of forming a primary amine under heating, such as 1,3dimetylurea, 1,3-diethylurea, and 1,3-dipropylurea, and ammonia and urea.

As the aromatic amine, there can be mentioned aniline, toluidine, and trifluoroaniline. As the alicyclic amine, there can be mentioned cyclohexylamine and bornylamine.

The amount of the imidizing agent varies depending upon the intended imidizing degree and cannot be simply defined. However, it is generally preferred that the imidizing agent be used in an amount of 1 to 250 parts by weight per 100 parts by weight of the fluoroalkyl methacrylate-containing polymer. If the amount of the imidizing agent is smaller than 1 part by weight per 100 parts by weight of the polymer, a substantial improvement of the heat resistance cannot be attained. If the amount of the imidizing agent is larger than 250 parts by weight per 100 parts by weight of the polymer, the method becomes economically disadvantageous.

In order to attain a low refractive index, the proportion of the methacrylimide structural units (A) occupying the polymer should not be large. Accordingly, the ratio of the methacrylimide structural units (A) to te structural units (B) is important.

The reaction of the starting fluoroalkyl methacrylate-containing polymer with the imidizing agent in a reaction vessel is carried out at 100° to 350° C., preferably 150° to 300° C.

If the reaction temperature is lower than 100° C., the imidization reaction is delayed. If the reaction temperature exceeds 350° C., decomposition of the starting resin concurrently occurs.

The reaction time is not particularly critical, but a shorter reaction time is preferred from the viewpoint of productivity. The reaction time is ordinarily 30 minutes to 5 hours.

If a large amount of water is present in the reaction mixture, hydrolysis of the ester segments, that is, the fluoroalkyl methacrylate segments, occurs as a side reaction during the imidization condensation, with the result that methacrylic acid is formed and an intended methacrylimide-containing polymer having a desirable imidizing degree cannot be obtained. Accordingly, it is preferred that the reaction be carried out in a substantially anhydrous state, that is, at a water content of not more than 1% by weight, more preferably, in a completely anhydrous state.

In order to prevent undesirable coloring of the obtained polymer, it is preferred that the reaction be carried out in an atmosphere of an inert gas such as nitrogen, helium or argon. The imidization degree of the resin is optionally set in the present invention, but in view of the heat resistance and refractive index, a polymer comprising 10 to 90% by weight of the methacrylimide structural units (A), 10 to 90% by weight of the structural units (B) and 0 to 50% by weight of the structural units (C) is especially preferred.

The kind of the reactor used for the condensation reaction is not particularly critical, so far as the attainment of the object of the invention is not inhibited. For example, a plug flow type reactor, a screw extrusion type reactor, a column reactor, a tube reactor, a duct reactor, and a tank top reactor may be used. In order to perform the imidization uniformly and obtain a homogeneous methacrylimide-containing polymer, it is preferable to use a tank type reactor, having a supply inlet and a withdrawal outlet, which is provided with a stirrer so that uniform mixing can be performed throughout the reactor.

At the step of separating the volatile substances, the majority of the volatile substances can be removed from the reaction product mixture containing the product formed by intermolecular condensation of the fluoroalkyl methacrylate-containing polymer with the imidizing agent.

The content of the residual volatile substances in the final polymer should be controlled to not more than 1% by weight, preferably not more than 0.1% by weight.

Removal of the volatile substances is performed by using an ordinary vented extruder or devolatilizer. Alternatively, there may be adopted a method in which the reaction product mixture is diluted with a solvent, the polymer is precipitated in a large amount of a non-dissolving medium, and the precipitated polymer is recovered by filtration and then dried.

The methacrylimide-containing fluoroalkyl methacrylate polymer obtained according to the foregoing procedures has a high transparency, a low refractive index and a high heat resistance. However, the polymer may become colored when the molding processing is repeated. Accordingly, an antioxidant may be added to the obtained polymer in the present invention.

As the hindered phenol type antioxidant to be added, there ca be mentioned 2,6-di-tert-butyl-p-cresol, and as the phosphite type antioxidant, there can be mentioned tetrakis(2,4-di-tert-butylphenol)-4,4'-biphenylene phosphonite. As the thioether type antioxidant, there can be mentioned dilauryl thiodipropionate.

The antioxidant is used in an amount of 0.01 to 5 parts by weight per 100 parts by weight of the methacrylimide-containing fluoroalkyl methacrylate polymer.

Furthermore, in order to impart special characteristics to the polymer, other additives such as a plasticizer, an ultraviolet absorber, an absorbing colorant, and a pigment may be added.

In the present invention, the preparation of the fluoroalkyl methacrylate-containing polymer may be carried out batchwise or in a continuous manner.

In the production of the fluoroalkyl methacrylate-containing polymer to be used as the starting resin in the present invention, an ordinary radical polymerization initiator may be used as the polymerization catalyst. For example, there can be used organic peroxides such as di-tert-butyl peroxide, dicumyl peroxide, and methyl ethyl ketone peroxide, and azo compounds such as methyl 2,2'-azobisisobutylate and 2,2'-azobisisobutyronitrile.

An alkyl mercaptan customarily used as the polymerization degree-adjusting agent may be used as the chain transfer agent for the polymerization.

As the polymerization method, there can be mentioned emulsion polymerization, suspension polymerization, bulk polymerization, and solution polymerization. In order to obtain a polymer having a high purity, it is preferable to adopt a bulk polymerization method.

Where the light transmitting fiber of the present invention has a core-cladding structure and the core is composed of an organic polymer as mentioned hereinbefore, the core material, the cladding material and, if necessary, organic polymers for the formation of protective and covering layers are supplied to a spinneret for the composite spinning, and a fiber is shaped by the composite melt spinning. Where the core material is a transparent inorganic substance such as a multi-component optical glass or quartz, the cladding component is melt-extruded around a preliminarily shaped core and coated on the core to form a core-cladding structure.

When the fiber is shaped by the above-mentioned composite melt spinning, in a broad shaping temperature range of from 180° C. to 270° C., abnormal phenomena such as foaming and whitening do not occur in the cladding portion, and the aperture number of the light transmitting fiber, which is an important physical factor that is influenced by the state of the interface between the cladding and core, is very close to the theoretical aperture number determined from the refractive indices of the core and cladding. This is an excellent characteristic of the light transmitting fiber of the present invention. Furthermore, the glass transition temperature of the cladding material is high, and although a conventional plastic light transmitting fiber cannot be used at a temperature higher than 100° C., the plastic light transmitting fiber of the present invention can be used at a temperature higher than 100° C. and the reliability is highly improved. Accordingly, the light transmitting fiber has a very high industrial value. Moreover, in the light transmitting fiber of the present invention, the adhesion between the core and cladding is excellent, and even if the fiber is bent, separation of the cladding does not occur and thus the practical reliability is much improved.

The present invention will now be described in detail with reference to the following examples. Note, in the examples, all of "parts" and "%" are by weight.

The properties of the polymers were determined in the examples according to the following methods.

(1) The infrared absorption spectrum was determined according to the KBr disc method using an infrared spectrophotometer (Model 285 supplied by Hitachi Ltd.).

(2) The inherent viscosity of the polymer was determined in the following manner. Namely, the flow time ($t_s$) of a dimethylformamide solution containing 0.5% by weight of a sample polymer and the flow time ($t_o$) of dimethylformamide were measured at 25° C.±0.1° C. by a Deereax-Bischoff viscometer, the relative viscosity $\eta_{rel}$ of the polymer was calculated from the value of $t_s/t_o$, and the inherent viscosity was calculated according to the following formula:
inherent viscosity=$(\ln \eta_{rel})/c$ (dl/g)
wherein c represents the amount (grams) of the polymer in 100 ml of the solvent.

(3) The heat distortion temperature was measured according to ASTM D-648.

(4) The melt index of the polymer was determined according to ASTM D-1238 (grams in 10 minutes under a load of 3.8 kg at 230° C.).

(5) The imidization degree (%) of the polymer was determined based on the nitrogen content obtained in the elementary analysis (CHN Coder MT-3 supplied by Yanagimoto Seisakusho) and the results obtained in the proton nuclear magnetic resonance analysis using a spectrometer (JNM-FM-100, JEOL) at 100 MHz.

(6) The adhesion was evaluated in the following manner. The methacrylimide-containing fluoroalkyl methacrylate polymer as the cladding material was pulverized by a crusher, and a fraction passing through a 16-mesh sieve left on a 32-mesh sieve (JIS Z-8801) was collected and heat-pressed at 180° C. under a pressure of 100 kg/cm² for 5 minutes to obtain a film having a thickness of 150 μm. The film was piled on a methacrylic resin plate having a thickness of 2 mm (Acrylite L-001 supplied by Mitsubishi Rayon Co.), a polycarbonate resin plate having a thickness of 2 mm (Iupilon H-3000 supplied by Mitsubishi Gas Chemical) or a methacrylimidecontaining acrylic resin plate having a thickness of 2mm, and heat lamination was carried out at 230° C. under a pressure of 5 kg/cm² for 10 seconds. Eleven cut lines were formed in the longitudinal direction on the laminate at intervals of 1 mm and eleven cut lines were formed in the lateral direction on the laminate at intervals of 1 mm. Each cut line had a depth of 1 mm and a razor was used for the formation of the cut lines. Thus, 100 square cuts 1 mm×1 mm were formed. An adhesive cellophane tape (supplied by Nichiban) was applied to the top surface and the tape was peeled off quickly. The adhesion was evaluated based on the number of square cuts adhering to the tape surface. In the same manner as described above, heat lamination was carried out on a multi-component optical glass and the adhesion was evaluated. The evaluation standard was as follows.

○: one square cut peeled off or no square cuts peeled off

Δ: 1 to 50 square cuts peeled off

×: 51 to 100 square cuts peeled off

The properties of the light transmitting fibers were evaluated according to the following methods.

(7) The light transmission loss was measured by measuring light wavelengths of 520 nm, 570 nm and 650 nm according to the method disclosed in Japanese Unexamined Patent Publication No. 58-7602.

(8) The aperture number of the light transmitting fiber was measured by using a measurement apparatus shown in FIG. 1 in the following manner.

Figure 2:
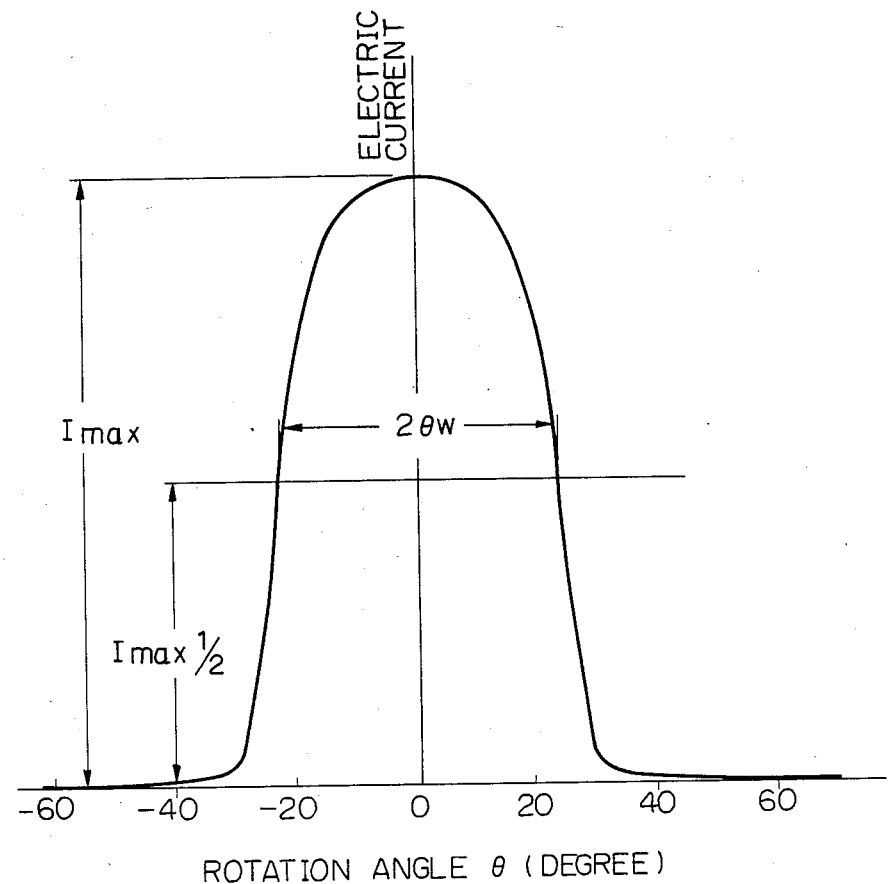

The output light of a parallel ray light source 1 having a halogen lamp installed therein was monochromatized throuogh an interference filter 2 having a central wavelength of 650 nm and a half value width of 3 nm, and the parallel rays were focussed by a lens 3 having an aperture number larger than that of the light transmitting fiber and were incident on one end face 5 of the light transmitting fiber 4. The end face 5 was formed by cutting the light transmitting fiber orthogonally to the fiber axis and smoothening the cut face, and the end face 5 was fixed by a fixing member 6 so that the fiber axis was in agreement with the optical axis 7. The incident light passed through the light transmitting fiber having an entire length of 15 mm and exited from the other face 8. The end face 8 smoothened orthogonally to the fiber axis was fixed to the center of a fixing axis 9 by a fixing member 10 so that the fiber axis was orthogonal to the center of the fixing axis 9. A rotary arm 11 was rotatable around the center of the fixing axis 9 and the rotation angle θ could be read. A light-detecting photoelectric amplifier tube 12 was attached in a case 13 to measure the quantity of the light passing through a hole 14 in terms of an electric current. The diameter of the hole 14 was 1.5 mm and the hole 14 was formed at a position 12.5 mm distant from the counter axis. By the apparatus having the structure shown in FIG. 1, the distribution of the going light was measured in terms of the relationship between the rotation angle θ of the rotary arm and the electric current of the photoelectric amplifier tube. An example of this relationship is shown in FIG. 2. The aperture number (NA) can be determined from the maximum current $I_{max}$ and the angle width $2\theta_w$, where $I_{max}$ is reduced to ½ according to the formula (1):
NA=sin $\theta_w$ (1)

(9) The heat resistance was evaluated in the following manner. The light transmitting fiber was placed as a sample in a thermostat tank maintained at 130° C., and the size retention ratio after thermal shrinkage was determined. Simultaneously, the transmission loss was measured at a wavelength of 650 nm and the light quantity retention ratio was determined.

(10) The thermal decomposition property was evaluated based on the heating weight loss (%) obtained when the cladding material was heated at 270° C. in air for 60 minutes.

Example 1

A solution prepared by mixing 100 parts of 2,2,3,3,3-pentafluoropropyl methacrylate with 0.05 part of 2,2'-azobisisobutyronitrile as the polymerization initiator, and 0.1 part of n-dodecylmercaptan, was charged into an autoclave for bulk polymerization having a capacity of 2 liters. Deaeration and substitution with nitrogen were repeated and the autoclave was sealed. Reaction was carried out at 50° C. for 10 hours and heat polymerization was then conducted at 70° C. for 5 hours. The peak of the generation of heat by the polymerization was ended and the polymerization was completed. Thus, a transparent polymer was obtained. The polymerizaton conversion was 99%.

The obtained polymer was pulverized and a fraction passing through a 16-mesh sieve and left on a 32-mesh sieve (JIS Z-8801) was collected. The refractive index of the obtained polymer was 1.405 and the inherent viscosity of the polymer was 0.51.

An autoclave equipped with a stirrer was charged with a starting material comprising 100 parts of the thus-obtained and sufficiently dried polymer, 90 parts of toluene washed with sulfuric acid, washed with water, dried by calcium chloride and purified by distillation, and 10 parts of methanol dehydrated, dried and purified by distillation, and the inner atmosphere was sufficiently substituted with nitrogen. Then, the starting material was stirred at 90 rpm. Then, 3.6 parts of dried methylamine was added to the starting material and reaction was carried out at 230° C. for 2 hours. The inner pressure reached 45 kg/cm²G, and a valve in the bottom portion of the reactor was opened and the formed polymer was quickly obtained. The formed polymer was vacuum-dried at 100° C. to obtain a white powdery polymer.

When the infrared absorption spectrum of the obtained polymer was determined, absorptions inherent to the methylmethacrylimide polymer were observed at 1663 cm$^{-1}$ and 750 cm$^{-1}$. In the nuclear magnetic resonance spectrum, a signal indicating the methacrylimide ring structure was confirmed, and from the intensity of the signal, it was found that the imidization degree was 51%. From the results of the elementary analysis, it was confirmed that the nitrogen content was 3.7% and the fluorine content was 24.3%. Thus, it was confirmed that the obtained polymer was a methacrylimide-containing 2,2,3,3,3-pentafluoropropyl methacrylate polymer having an imidization degree of 51%. The refractive index ($n_D^{25}$) was 1.443. When the properties of the polymer were measured, the following results were obtained.

Inherent viscosity: 0.50 dl/g
Melt index: 85 g/10 min
Heat distortion temperature: 120° C.

A film having a thickness of 150 μm was prepared from this polymer and the adhesion of this film to a methacrylic resin plate, a methacrylimide-containing methacrylic resin plate, and a polycarbonate plate was evaluated. The adhesion to each of these plates was very good. This polymer was used as the cladding component.

When this cladding material was heated at 270° C. for 60 minutes in air, the heating weight loss was 0.5%.

The core component was prepared in the following manner.

A starting material comprising 100 parts of a sufficiently dried methyl methacrylate polymer (Acrypet VH supplied by Mitsubishi Rayon, Co., inherent viscosity=0.51 dl/g), 90 parts of toluene washed with sulfuric acid, washed with water, dried, distilled and filtered through fluoropore (supplied by Sumitomo Elec. Ind. Ltd.) having a pore size of 0.1 μm and 10 parts of methanol dehydrated, dried and filtered through Fluoropore having a pore size of 0.1 μm was charged in a dissolving tank. The inner atmosphere was sufficiently substituted with nitrogen, and the starting material was stirred at 200° C. to dissolve the polymer. The solution was then continuously fed at a feed rate of 5 kg/hr to a reaction tank, and the stirring rotation number and temperature were adjusted to 90 rpm and 230° C., respectively. Then, methylamine dried and filtered through Fluoropore having a pore size of 0.1 μm was continuously fed at a feed rate of 14 mole/hr into the reaction tank, the inner pressure of which was adjusted to 48 kg/cm²G and the temperature in the reaction tank was maintained at 230° C. The average residence time in the reaction tank was 2 hours.

The reaction product withdrawn from the reaction tank was fed to an aging tank and aged at 230° C. under sufficient stirring for an average residence time of 1.0 hour. The aged reaction product was continuously fed to a vented extruder to separate and remove volatile substances. The temperatures of a vent portion and of an extrusion portion of the vented extruder were 250° C., and the volatile components were separated in the vent portion under a vacuum of 4 mmHg. The polymer was then passed through a gear pump portion maintained at 250° C. and fed to a core-sheath composite spinning head maintained at 250° C. The above-mentioned polymer was fed as the cladding component to the composite spinning head. Extrusion was carried out at 250° C., and the extrudate was taken up at 10 m/min and drawn at a draw ratio of 1.8 and a drawing temperature of 160° C. to obtain a composite filament having a winding diameter of 500 μm and a core diameter of 480 μm. When the composite filament was observed by a microscope, it was found that the interface between the core and cladding had a shape of a true circle and no foreign substance was present in the interface. The transmission loss of this filament was 525 dB/dm in the case of a ray having a wavelength of 650 nm, 435 dB/km in the case of a ray having a wavelength of 570 nm, and 662 dB/km in the case of a ray having a wavelength of 520 nm.

The properties of the polymer used as the core component were determined. In the infrared absorption spectrum, absorptions inherent to the methylmethacrylimide polymer were observed at 1663 cm$^{-1}$ and 750 cm$^{-1}$. In the nuclear magnetic resonance spectrum, a signal indicating the methacrylimide ring structure was confirmed, and from the intensity of the signal, it was confirmed that the imidization degree was 70%. From the results of the elementary analysis, it was found that the nitrogen content was 6.63%, and the portion other than the methacrylimide ring structure consisted substantially of methyl methacrylate monomer units. The inherent viscosity was 0.53 dl/g, the melt index was 3.52 g/10 min, and the heat distortion temperature was 142° C. The refractive index ($n_D^{25}$) of the polymer was 1.530.

The aperture number of the obtained filament was 0.482, which was close to the theoretical aperture number of 0.509 calculated from the refractive index of the core ($n_1 = 1.530$) and the refractive index of the cladding ($n_2 = 1.443$) (NA = $\sqrt{n_1^2 - n_2^2}$). When this filament was wound on a circular column having a diameter of 5 mm, no cracks were formed in the cladding.

When the filament was held in a thermostat tank maintained at 130° C. for 500 hours, the filament size did not substantially vary and the size retention ratio in the longitudinal direction after thermal shrinkage was higher than 99.5%. The transmission loss also did not substantially vary, and was 530 dB/km in the case of a ray having a wavelength of 650 nm.

EXAMPLE 2

The same cladding material as used in Example 1 was similarly used. The core material was prepared in the following manner.

By using a reaction tank equipped with a spiral ribbon type stirrer and a volatile substance-separating apparatus comprising a biaxial screw vented extruder, according to the continuous bulk polymerization method, a monomer mixture comprising 100 parts of methyl methacrylate, 0.40 part of tert-butylmercaptan and 0.017 part of di-tert-butyl peroxide was reacted aat a polymerization temperature of 155° C. for an average residence time of 4.0 hours, and volatile substances were removed under conditions such that, in the vented extruder, the temperature of the vent portion was 250° C., the temperature of the extrusion portion was 250° C., and the vacuum degree of the vent portion was 4 mmHg. The formed polymer was passed through a gear pump portion maintained at 230° C. and fed to a core-sheath composite spinning head maintained at 250° C.

The same cladding component as used in Example 1 was fed to the composite spinning head. Extrusion was carried out at 250° C., and the extrudate was taken up at 10 m/min and drawn at a draw ratio of 1.8 and a drawing temperature of 140° C. to obtain a composite filament having a winding diameter of 500 $\mu$m and a core diameter of 480 $\mu$m. When the composite filament was observed by a microscope, it was found that the interface between the core and cladding had a shape of a true circle and no foreign substance was present in the interface. The transmission loss of the filament was 135 dB/km in the case of a ray having a wavelength of 650 nm, 80 dB/km in the case of a ray having a wavelength of 570 nm, and 85 dB/km in the case of a ray having a wavelength of 520 nm.

The aperture number of the filament was 0.350 and was very close to the theoretical aperture number of 0.379 calculated from the refractive index of the core ($n_1 = 1.492$) and the refractive index of the cladding ($n_2 = 1.443$) (NA = $\sqrt{n_1^2 - n_2^2}$). When the filament was wound on a circular column having a diameter of 5 mm, no cracks were formed in the cladding. When the filament was held in a thermostat tank maintained at 80° C. for 500 hours, no substantial thermal shrinkage occurred and the size retention ratio in the longitudinal direction was 99%. The transmission loss was 135 dB/km in the case of a ray having a wavelength of 650 nm.

EXAMPLE 3

The cladding component was prepared in the following manner.

A mixture comprising 100 parts of 2,2,2-trifluoroethyl methacrylate, 0.05 part of 2,2-azobisisobutyronitrile and 0.1 part of n-dodecylmercaptan was polymerized in the same manner as described in Example 1, and the obtained polymer was methacrylimidized. Methylamine was used in an amount of 4.7 parts per 100 parts of the 2,2,2-trifluoroethyl methacrylate polymer.

From the nuclear magnetic resonance spectrum, it was confirmed that the imidization degree was 53%. From the results of the elementary analysis, it was found that the nitrogen content was 4.43% and the fluorine content was 16%. The refractive index ($n_D^{25}$) was 1.460. The properties of the polymer were as follows.

Inherent viscosity: 0.52 dl/g
Melt index: 7.9 g/10 min
Heat distortion temperature: 125° C.

The adhesion of a film having a thickness of 150 $\mu$m, prepared from this polymer, to a methacrylic resin plate, a methacrylimide-containing resin plate, and a polycarbonate resin plate was good.

By using this polymer as the cladding component and the same polymer as used in Example 1 as the core component, core-sheath composite spinning was carried out to obtain a light transmitting filament having a winding diameter of 500 $\mu$m and a core diameter of 480 $\mu$m. The transmission loss was 520 dB/km in the case of a ray having a wavelength of 650 nm, 430 dB/km in the case of the ray having a wavelength of 510 nm, and 660 dB/km in the case of a ray having a wavelength of 520 nm. The aperture number of the filament was 0.430 and very close to the theoretical aperture number of 0.457 calculated from the refractive index of the core ($n_1 = 1.530$) and the refractive index of the cladding ($n_2 = 1.460$) (NA = $\sqrt{n_1^2 - n_2^2}$). When the filament was wound on a circular column having a diameter of 5 mm, no cracks were formed in the cladding. When the filament was held in a thermostat tank maintained at 130° C. for 500 hours, no thermal shrinkage occurred and the size retention ratio in the longitudinal direction was higher than 99.5%. The transmission loss did not substantially vary and was 550 dB/km in the case of a ray having a wavelength of 650 nm.

EXAMPLE 4

The methacrylimide ring structure-containing 2,2,2-trifluoroethyl methacrylate polymer obtained in Example 3 was used as the cladding component and was melt-extruded to cover a core composed of a glass fiber having a diameter of 100 $\mu$m obtained from a multi-component optical glass having a refractive index of 1.59, and the extrudate was taken up at 25 m/min to obtain a light transmitting fiber. The average thickness of the cladding was 20 $\mu$m. The adhesion of the cladding to the multi-component optical glass as the core was good.

EXAMPLES 5 THROUGH 13

A polymer comprising methacrylimide ring structure units (A), fluoroalkyl methacrylate units (B) and vinyl monomer units (C) at a ratio shown in Table 1 was prepared as the cladding component in the same manner as described in Example 1. This polymer and a core material shown in Table 1 were composite-melt-spun to form a light transmitting fiber. The properties of the cladding polymer and the properties of the light transmitting fiber were determined. The obtained results are shown in Table 2.

COMPARATIVE EXAMPLE 1

The 2,2,3,3,3-pentafluoropropyl methacrylate polymer free of the methacrylimide ring structure units (A), which was obtained in Example 1 before the imidization reaction, was used as the cladding component. The same core polymer as used in Example 1 was used as the core. Both the polymers were composite-melt-spun to obtain a light transmitting fiber. The adhesion between the core and sheath was insufficient, and when the heat resistance test was carried out in a thermostat tank maintained at 130° C., thermal shrinkage occurred only in the sheath. Accordingly, after the heat resistance test had been conducted at 130° C. for 500 hours, the light transmitting property was degraded and the fiber could not be put to practical use. Furthermore, when the heat resistance test was conducted at 80° C. for 500 hours, the light transmitting property was similarly reduced. If the cladding material was held at 270° C. in air for 2 hours, the weight loss by heating was 89%. The obtained results are shown in Tables 1 and 2.

COMPARATIVE EXAMPLE 2

The same core material as used in Example 10 was used as the core, and the 2,2,2-trifluoroethyl methacrylate polymer free of the methacrylimide ring structure units (A), which was obtained in Example 3 (Example 10) before the imidization reaction, was used as the cladding material. Both the polymers were composite-melt-spun to obtain a light transmitting fiber. The adhesion between the core and sheath was poor as in Comparative Example 1. When the heat resistance test was carried out at 130° C. for 500 hours, thermal shrinkage was caused only in the sheath and the light transmitting property was reduced. Furthermore, when the heat resistance test was conducted at 80° C. for 500 hours, the light transmitting property was similarly reduced. When the cladding material was held at 270° C. in air for 2 hours, the weight loss by heating was 90%. The obtained results are shown in Tables 1 and 2.

COMPARATIVE EXAMPLE 3

The methyl methacrylate polymer described in Example 2 was used as the core material and the 2,2,3,3,3-pentafluoropropyl methacrylate polymer described in Comparative Example 1 was used as the cladding material. When the obtained filament was heat-tested at 130° C. for 500 hours, both the core and sheath shrunk and the fiber became very brittle. The obtained results are shown in Tables 1 and 2.

TABLE 1

| | | Composition of Cladding Material | | | | | |
|---|---|---|---|---|---|---|---|
| | | Structural Units (A) | | Structural Units (B) | | Structural Units (C) | |
| | Core Material | Kind | Parts | Kind | Parts | Kind | Parts |
| Example No. | | | | | | | |
| 1 | N—methylmethacrylimide-containing methyl methacrylate polymer | N—methylmethacrylimide | 51 | 2,2,3,3,3-pentafluoropropyl methacrylate | 49 | — | — |
| 2 | methyl methacrylate polymer | N—methylmethacrylimide | 51 | 2,2,3,3,3-pentafluoropropyl methacrylate | 49 | — | — |
| 3 | N—methylmethacrylimide-containing methyl methacrylate polymer | N—methylmethacrylimide | 53 | 2,2,2-trifluoroethyl methacrylate | 47 | — | — |
| 4 | multi-component glass | N—methylmethacrylimide | 53 | 2,2,2-trifluoroethyl methacrylate | 47 | — | — |
| 5 | N—methylmethacrylimide-containing methyl methacrylate polymer | N—methylmethacrylimide | 55 | 2,2,3,3,3-pentafluoropropyl methacrylate | 40 | methyl methacrylate | 5 |
| 6 | N—methylmethacrylimide-containing methyl methacrylate polymer | N—methylmethacrylimide | 60 | 2,2,2',2',2'-hexafluoroisopropyl methacrylate | 40 | — | — |
| 7 | N—methylmethacrylimide-containing methyl methacrylate polymer | N—methylmethacrylimide | 58 | 2,2,2',2',2'-hexafluoroisopropyl methacrylate | 40 | methacrylic acid | 2 |
| 8 | N—methylmethacrylimide-containing methyl methacrylate polymer | N—methylmethacrylimide | 70 | 2,2,3,3,4,4,5,5,6,6,7,7,8,8,9,9,9-heptadecafluorononane methacrylate | 30 | — | — |
| 9 | N—methylmethacrylimide-containing methyl methacrylate polymer | N—methylmethacrylimide | 80 | 2,2,3,3,4,4,5,5,6,6,7,7,8,8,9,9,9-hepdecafluorononane methacrylate | 20 | — | — |
| 10 | polycarbonate | N—methylmethacrylimide | 53 | 2,2,2-trifluoroethyl methacrylate | 47 | — | — |
| 11 | N—methylmethacrylimide-containing methyl methacrylate polymer | methacrylimide | 20 | 2,2,2-trifluoroethyl methacrylate | 80 | — | — |
| 12 | N—methylmethacrylimide-containing methyl methacrylate polymer | N—cyclohexylmethacrylimide | 50 | 2,2,3,3,3-pentafluoropropyl methacrylate | 50 | — | — |
| 13 | N—cyclohexylmethacrylimide-containing methyl methacrylate polymer | N—cyclohexylmethacrylimide | 50 | 2,2,3,3,3-pentafluoropropyl methacrylate | 50 | — | — |
| Comparative Example No. | | | | | | | |

TABLE 1-continued

| | Core Material | Composition of Cladding Material | | | | | |
|---|---|---|---|---|---|---|---|
| | | Structural Units (A) | | Structural Units (B) | | Structural Units (C) | |
| | | Kind | Parts | Kind | Parts | Kind | Parts |
| 1 | N—methylmethacryl-imide-containing methyl methacrylate polymer | — | — | 2,2,3,3,3-penta-fluoropropyl methacrylate | 100 | — | — |
| 2 | polycarbonate | — | — | 2,2,2-trifluoro-ethyl methacrylate | 100 | — | — |

Note
(1) The same core material was used in Examples 1, 3, 5 through 9, 11, and 12 and Comparative Example 1.
(2) The core material used in Example 13 was prepared from the same recipe as that of the core material of Example 1 but cyclohexylamine was used as the imidizing agent. This core material had an imidization degree of 75%, a heat distortion temperature of 138° C., and a refractive index ($n_D^{25}$) of 1.535.
(3) The polycarbonate used in Example 10 and Comparative Example 2 was Europin H-3000 supplied by Mitsubishi Gas Chemical Co.

TABLE 2

| | Properties of Cladding Material | | | | Properties of Core Material | | Transmission Loss | | | Aperture Number | | Heat Resistance (130° C., 500 hours:80° C., 500 hours) | |
|---|---|---|---|---|---|---|---|---|---|---|---|---|---|
| | Refractive Index ($n_D^{25}$) | Heat Distortion Temperature (°C.) | Adhesion | Thermal Recomposition Ratio (%) | Refractive Index ($n_D^{25}$) | Heat Distortion Temperature (°C.) | 520 nm (dB/km) | 570 nm (dB/km) | 650 nm (dB/km) | Found Value | Theoretical Value | Size Retention Ratio (%) after Thermal Shrinkage | Light Quantity Retention Ratio (650 nm, %) |
| Example No. | | | | | | | | | | | | | |
| 1 | 1.443 | 120 | o | 0.5 | 1.530 | 142 | 520 | 435 | 525 | 0.482 | 0.509 | 99.5 | 99 |
| 2 | 1.443 | 120 | o | 0.5 | 1.492 | 100 | 85 | 80 | 135 | 0.350 | 0.379 | (99) | (100) |
| 3 | 1.460 | 125 | o | 0.6 | 1.530 | 142 | 660 | 430 | 520 | 0.430 | 0.457 | 99.5 | 98 |
| 4 | 1.460 | 125 | o | 0.6 | 1.59 | — | — | — | 80 | 0.600 | 0.630 | 99.5 | 99 |
| 5 | 1.452 | 125 | o | 0.5 | 1.530 | 142 | 530 | 450 | 530 | 0.465 | 0.482 | 99.5 | 99 |
| 6 | 1.445 | 130 | o | " | " | " | 550 | 470 | 530 | 0.490 | 0.503 | 98 | 98 |
| 7 | 1.441 | 130 | o | " | " | " | 570 | 510 | 550 | 0.480 | 0.514 | 99 | 99 |
| 8 | 1.421 | 121 | o | " | " | " | 550 | 450 | 490 | 0.540 | 0.567 | 99 | 98 |
| 9 | 1.437 | 118 | o | " | " | " | 620 | 510 | 550 | 0.501 | 0.525 | 99 | 97 |
| 10 | 1.460 | 125 | o | 0.5 | 1.585 | 128 | 1250 | 950 | 1550 | 0.580 | 0.617 | 85 | 97 |
| 11 | 1.437 | 130 | o | 0.2 | 1.530 | 142 | 550 | 495 | 570 | 0.495 | 0.525 | 99 | 99 |
| 12 | 1.450 | 125 | o | 0.5 | 1.530 | 142 | 620 | 430 | 550 | 0.452 | 0.488 | 99 | 99 |
| 13 | 1.450 | 125 | o | 0.5 | 1.535 | 138 | 720 | 690 | 780 | 0.473 | 0.504 | 97 | 99 |
| Comparative Example No. | | | | | | | | | | | | | |
| 1 | 1.410 | 70 | x | 89 | 1.530 | 142 | 430 | 440 | 530 | 0.580 | 0.594 | 99*1 | 0 (0) |
| 2 | 1.425 | 83 | x | 90 | 1.585 | 128 | 1350 | 920 | 1520 | 0.670 | 0.694 | 85*1 | 0 (0) |
| 3 | 1.410 | 70 | x | 89 | 1.492 | 100 | 85 | 80 | 140 | 0.468 | 0.488 | 56 (99) | 0 (0) |

We claim:

1. A light transmitting fiber comprising a transparent inorganic substance selected from the group consisting of quartz and multi-component optical glass or a transparent organic polymeric material as a core component and a methacrylate polymer as a cladding component, said methacrylate polymer being a methacrylimide-containing fluoroalkylmethacrylate polymer comprising:
  (A) 2–98% by weight of methacrylimide units having the following formula (I):

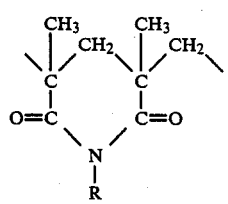

wherein r represents a hydrogen atom or an aliphatic, aromatic or alicyclic hydrocarbon group having 1–20 carbon atoms;
  (B) 98–2% by weight of structural units derived from a fluoroalkylmethacrylate monomer; and
  (C) 0–50% by weight of structural units derived from at least one monomer selected from the group consisting of acrylic acid, methacrylic acid, an acrylic acid ester, a methacrylic acid ester, and styrene.

2. The light transmitting fiber as set forth in claim 1, wherein R in the general formula (I) is selected from the group consisting of a hydrogen atom, a methyl group, an ethyl group, a propyl group, an n-butyl group, an isobutyl group, a tert-butyl group, a phenyl group, a substituted phenyl group, a cyclohexyl group or a bornyl group.

3. The light transmitting fiber as set forth in claim 1, wherein R in the general formula (I) is selected from the group consisting of a hydrogen atom, a methyl group and a cyclohexyl group.

4. The light transmitting fiber as set forth in claim 1, wherein the structural units derived from the fluoroalkyl methacrylate (B) are represented by the following general formula monomer (II) or (III):

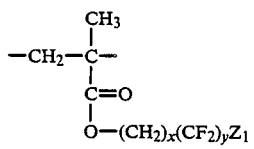

wherein x is 1 or 2, y is 0 or an integer of from 1 to 10, and $Z_1$ represents a hydrogen atom or a fluorine atom, or

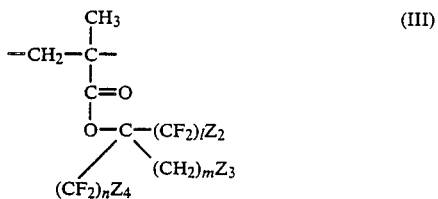

wherein l, m and n are 0 or integers of from 1 to 10, and $Z_2$, $Z_3$ and $Z_4$ represent a hydrogen atom or a fluorine atom, with the proviso that the case where all of l, m and n are 0 and the case where all of $Z_2$, $Z_3$ and $Z_4$ represent a hydrogen atom are excluded.

5. The light transmitting fiber as set forth in claim 1, wherein the fluoroalkyl methacrylate monomer is at least one member selected from the group consisting of 2,2,2-trifluoroethyl methacrylate, 2,2,3,3-tetrafluoropropyl methacrylate, 2,2,3,3,3-pentafluoropropyl methacrylate, 2,2,3,3,4,4-hexafluorobutyl methacrylate, 2,2,3,3,4,4,4-heptafluorobutyl methacrylate, 2,2,3,3,4,4,5,5,6,6,7,7,8,8,9,9,9-heptadecafluorononane methacrylate, 2,2,2,2′,2′,2′-hexafluoroisopropyl methacrylate and 2,2,2,2′,2′-pentafluoroisopropyl methacrylate.

6. The light transmitting fiber as set forth in claim 1, wherein the monomer (C) is at least one member selected from the group consisting of methacrylic acid, methyl methacrylate and styrene.

* * * * *